No. 820,530. PATENTED MAY 15, 1906.
W. STURM.
ROCK DRILL.
APPLICATION FILED MAR. 11, 1905.
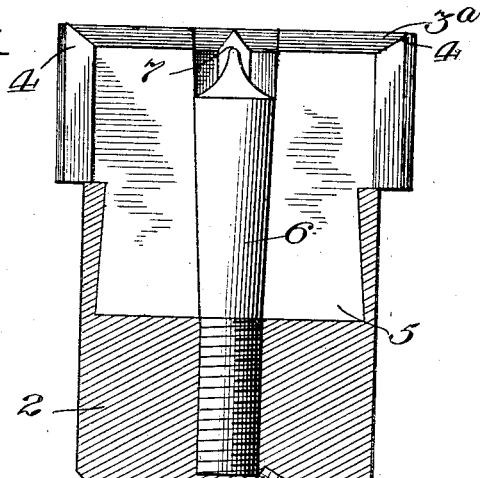
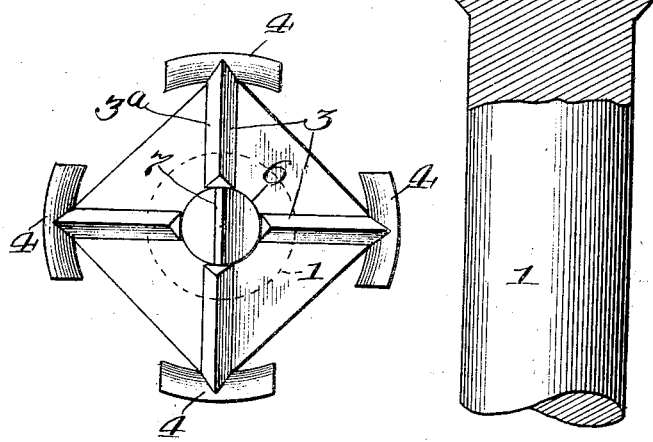
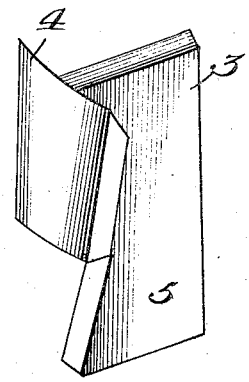
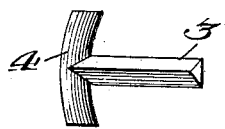
Witnesses:
Inventor:
William Sturm

UNITED STATES PATENT OFFICE.

WILLIAM STURM, OF CHICAGO, ILLINOIS.

ROCK-DRILL.

No. 820,530. Specification of Letters Patent. Patented May 15, 1906.

Application filed March 11, 1905. Serial No. 249,602.

*To all whom it may concern:*

Be it known that I, WILLIAM STURM, a citizen of the United States, residing at Chicago, in the county of Cook and State of Illinois, have invented a certain new and useful Improvement in Rock-Drills, of which the following is a full, clear, concise, and exact description, reference being had to the accompanying drawings, forming a part of this specification.

My invention relates to rock-drills adapted for attachment to the end of a drill-rod.

Prominent objects of the invention are to provide a simple, practical, and inexpensive form of rock-drills to arrange for the easy and ready renewing or repairing of the cutting member of the drill, to secure a highly efficient and effective cutting action, and to accomplish the foregoing and other desirable ends in a simple and expeditious manner.

In the accompanying drawings, Figure 1 is a view, partly in elevation and partly in longitudinal section, of a drill-rod and drill embodying my invention. Fig. 2 is a top view of the same. Fig. 3 is a perspective view of one of the cutters. Fig. 4 is a top view of the same.

The drill shown comprises a drill-rod 1, provided with the drill comprising a shank 2, desirably of rectangular cross-section, as shown in Fig. 2. The end of the shank 2 is provided with a plurality of cutters 3 3, desirably four in number, and these are fitted into slots or recesses formed at the end of the shank 2. The four cutters are conveniently arranged on the diagonals of the rectangle formed by the cross-section of the shank, as shown in Fig. 2. Each cutter is provided with a horizontal cutting edge $3^a$ and also with a peripheral cutting edge 4 at the outer or peripheral end of the cutting edge $3^a$. The inner ends 5 5 of the cutters 3 3 are flared outwardly, as shown in Figs. 1 and 3, and the sockets in the shank 2 are correspondingly flared to receive them. These cutters are also tapered slightly so as to accommodate a locking screw-plug 6, which fits centrally in the drill between the various cutters and has its inner end threaded and screwed into a threaded socket in the shank 2. Thus the cutters 5 5 are locked in position by the threaded locking screw-plug 6, holding them firmly in their sockets. The plug 6 is desirably provided with a cutting edge 7. The plug 6 is held firmly in position by a set-screw 8. Thus the cutters are bodily removable from the shank to permit them to be withdrawn and repaired or replaced. When in position in the shank, they are firmly held and practically wedged in their sockets. The peripheral cutting edges 4 4, together with the horizontal cutting edges 3 3 and 7, form an effective and efficient cutting arrangement.

Thus it will be seen that the drill embodying my invention has the advantage of permitting the cutters to be made of any desired material—as, for example, steel—which can be tempered as desired, and that these cutters can be inserted in the drill for use and removed and repaired or replaced as desired.

Changes and modifications can be made in the device herein described without departing from the spirit of my invention.

What I claim is—

1. A rock-drill comprising a shank, a plurality of removable cutters arranged on opposite sides of the center of the drill, said cutters being provided with peripheral cutting edges, and a central locking device for locking said cutters in their sockets, said locking device being also provided with a cutting edge located between oppositely-disposed cutters.

2. A rock-drill comprising a shank, a plurality of removable cutters arranged radially on opposite sides of the center of rotation of the drill, and a central locking device for locking said cutters in their sockets, said locking device having a cutting edge which extends between oppositely-disposed radial cutters, and thereby forms a continuous or substantially continuous straight cutting-surface from one edge of the drill to the other.

3. A rock-drill comprising a shank provided with a plurality of sockets or slots flared outwardly in a radial direction at their inner ends, in combination with a corresponding number of cutters adapted to fit in said slots, and similarly flared, and a centrally-disposed locking device for forcing said cutters outwardly and thereby locking them in their sockets.

In witness whereof I hereunto subscribe my name this 4th day of March, A. D. 1905.

WILLIAM STURM.

Witnesses:
 A. M. BELFIELD,
 I. C. LEE.